United States Patent [19]

Schmidt et al.

[11] Patent Number: 4,977,987

[45] Date of Patent: Dec. 18, 1990

[54] HYDRAULICALLY ACTUATABLE BRAKING APPARATUS, IN PARTICULAR FOR SPOT-TYPE DISC BRAKES

[75] Inventors: Herbert Schmidt, Frankfurt am Main; Erhard Czich, Eppstein; Horst Häfner, Steinbach, all of Fed. Rep. of Germany

[73] Assignee: Alfred Teves GmbH, Frankfurt am Main, Fed. Rep. of Germany

[21] Appl. No.: 13,703

[22] Filed: Feb. 12, 1987

[30] Foreign Application Priority Data

Feb. 14, 1986 [DE] Fed. Rep. of Germany ....... 3604613

[51] Int. Cl.$^5$ ............................................. F16D 65/78
[52] U.S. Cl. .................................. 188/264 G; 92/168
[58] Field of Search ..................... 188/264 G; 92/168; 403/50, 51, 261, 326; 285/319, 424, 921; 277/50, 181, 182, 189

[56] References Cited

U.S. PATENT DOCUMENTS

| | | | |
|---|---|---|---|
| 718,599 | 1/1903 | Bubb | 285/319 |
| 3,396,975 | 8/1968 | Otto | 277/50 X |
| 3,540,554 | 11/1970 | Burnett et al. | 188/264 G X |
| 3,899,198 | 8/1975 | Maroschak et al. | 285/921 X |
| 3,989,259 | 11/1976 | Lorenz et al. | 277/182 X |
| 4,401,012 | 8/1983 | Emmett | 185/264 G X |
| 4,451,069 | 5/1984 | Melone | 285/921 X |
| 4,527,672 | 7/1985 | Schreiner et al. | 188/264 G |
| 4,572,336 | 2/1986 | Smith et al. | 188/264 G X |
| 4,582,180 | 4/1986 | Lauterwesser et al. | 185/264 G |
| 4,606,436 | 8/1986 | Mery et al. | 188/264 G |

FOREIGN PATENT DOCUMENTS 2165902  4/1986  United Kingdom ........... 188/264 G

Primary Examiner—George E. A. Halvosa
Attorney, Agent, or Firm—Robert P. Seitter; J. Gordon Lewis

[57] ABSTRACT

A hydraulically actuated braking apparatus, for spot-type disc brakes is disclosed including a piston having an actuating end, protrudes from the brake housing and which acts on a brake pad. The piston is provided with a shoulder, and a metal ring is mounted on the piston's outside surface. An elastic folded collar is fastened behind the metal ring. The outside surface of the piston has at least one indentation of a specific shape and size in the area of the protruding end of the piston. So as to effect a tight fit of the metal ring on the piston, projections are distributed on the inside circumference of the metal ring on elastic ring elements which elements are axially bent out of the radial plane. Guide surfaces are also distributed at the inside circumference of the ring for fastening the metal ring at the piston in a predetermined position.

5 Claims, 2 Drawing Sheets

U.S. Patent    Dec. 18, 1990    Sheet 2 of 2    4,977,987

HYDRAULICALLY ACTUATABLE BRAKING APPARATUS, IN PARTICULAR FOR SPOT-TYPE DISC BRAKES

BACKGROUND OF THE INVENTION

This invention relates to a hydraulically actuable braking apparatus.

More particularly the invention relates to a hydraulic brake of the type disclosed in German Patent DE No. 31 44 868 Cl. In that braking apparatus an annular groove is provided at the ends of the piston which protrude from the cylinder and a plane metal ring with several tongues bent somewhat out of the radial plane are disposed in the groove.

This ring and piston structure suffers from the shortcoming that, especially during assembly and maintenance of the brake, it is possible that the metal ring will be ejected out of the seat within the annular groove due to, for example, imposition of a force or torque acting on the metal ring. Particularly because of the plane design of the metal ring, it is also possible that the ring will be moved out of the groove by a lever force due to insertion of a tool or some other object into the gap between gasket and metal ring.

SUMMARY OF THE INVENTION

For these reasons it is an object of this invention to provide for an improved hydraulic braking apparatus so as to provide a tight fit between the metal ring and the piston.

According to the invention a metal ring is provided for protecting a folded collar arranged behind the ring from thermal influences and from mechanical action.

According to an important feature of the invention, the metal ring is provided with inwardly directed knobs radially distributed at the inside circumference of the metal ring at elastic ring piston elements which are axially bent out of the radial plane. The knobs are received in indentations in the piston and effect the connection between the metal ring and the piston in a defined axial position.

According to a further advantageous feature of the invention, the metal ring is U-shaped whereby it is provided with increased stiffness.

According to a still further important feather, the ring's outside circumference is bent to the rear and partially embraces the folded collar and thus is able to protect the collar from mechanical action from the radial direction.

The piston is provided with a chamfer for the purpose of providing for improved fitting of the metal ring.

A still further important feature is that the axial position of the chamfer at the piston end and the axial position of the metal ring relative to each other are selected such as to ensure that upon movement of the brake caliper, for example when it is swung out around one mounting pin, the brake piston, which might otherwise protrude outward from the cylinder, is moved back into the cylinder of the housing.

BRIEF DESCRIPTION OF THE DRAWINGS

The invention will be described in the following Detailed Description of the Peferred Embodiment in conjunction with the drawings wherein.

DETAILED DESCRIPTION OF THE PREFERRED EMBODIMENT

Figure 1:
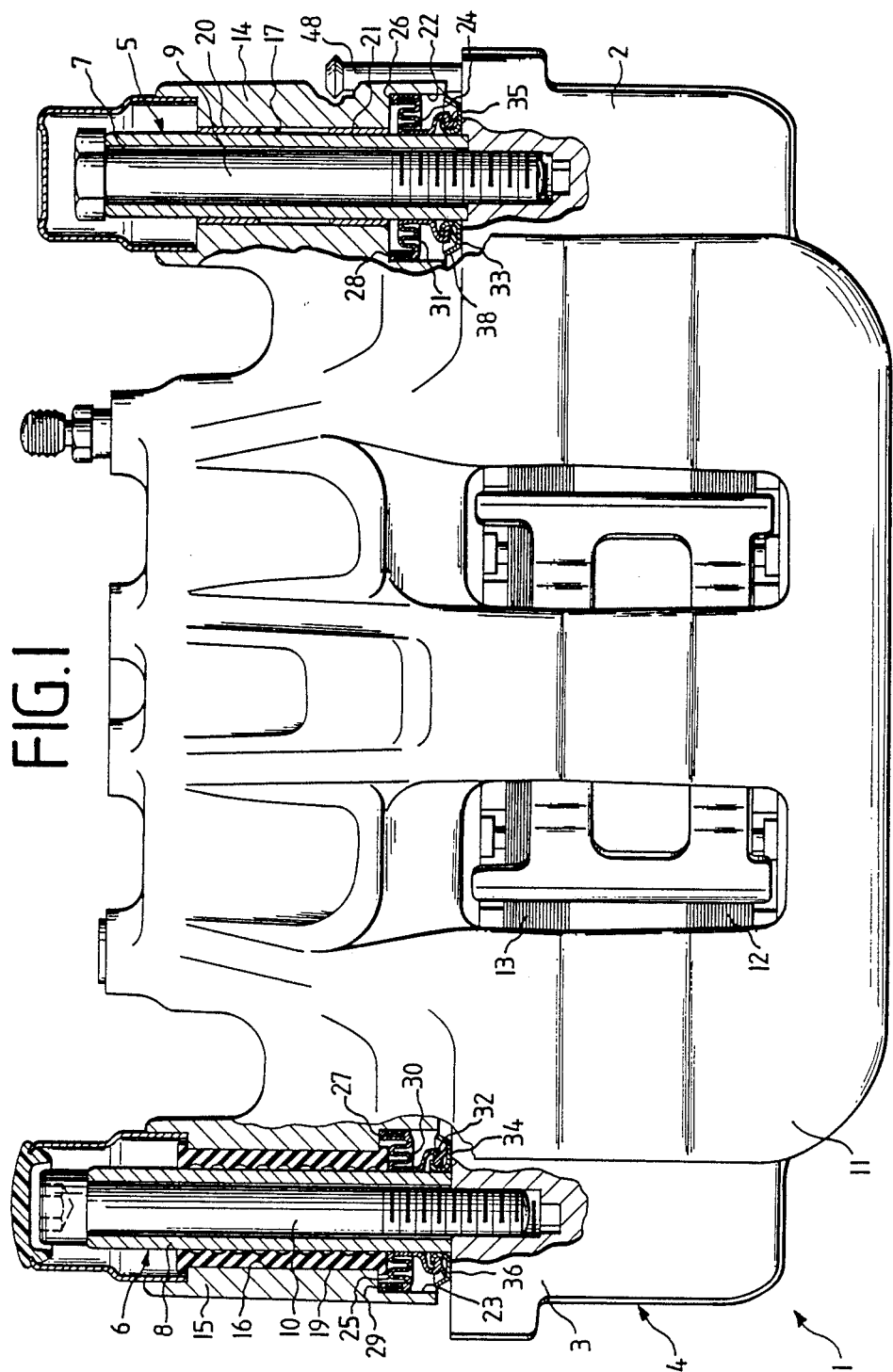
FIG. 1 is a plan view of a spot-type disc brake according to the invention.
Figure 2:
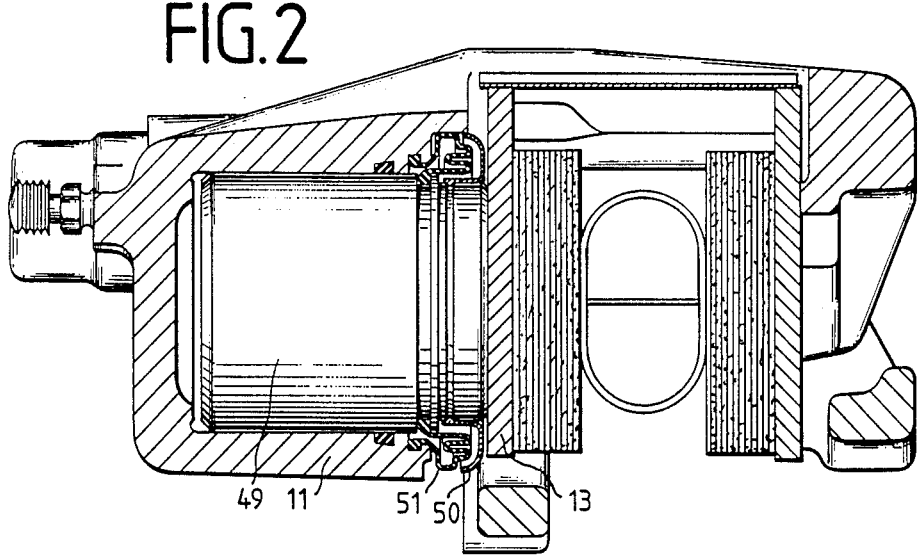
FIG. 2 is an axial section taken through a spot-type disc brake showing details of construction.
Figure 4:
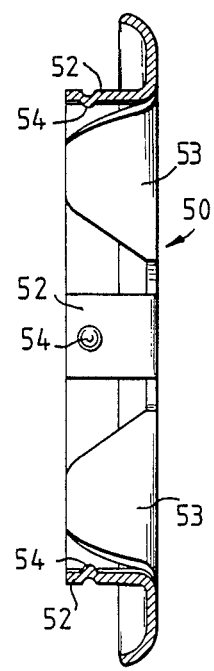
FIG. 4 is a vertical sectional view of the metal ring showing further details of construction.
Figure 3:
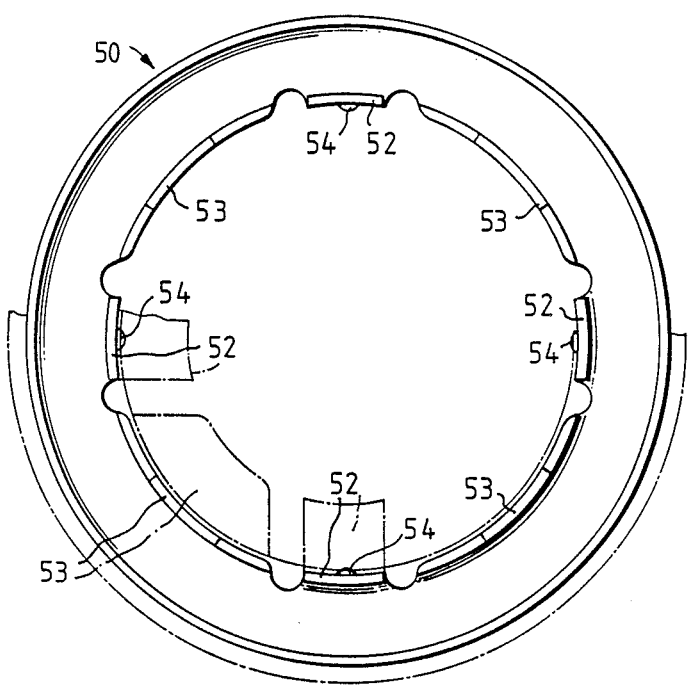
FIG. 3 is an end view of the metal ring showing details of construction.

In the spot-type disc brake 1 illustrated in the drawing axial guide bolts 5, 6 are fastened at a brake carrier's 4 two holding arms 2, 3 which are circumferentially spaced apart. The axial guide bolts 5, 6 each include a guide sleeve 7, 8 through which screw's 9, 10 are passed. The screws 9, 10 have threaded portions which are threaded into corresponding threads within the brake carrier 4. When fastened, the heads of the screws 9, 10 press against the respective front sides of the guide sleeves 7, 8 so that the same are clamped between the head of the respective screw and the holding arm.

Arranged between the holding arms 2, 3 of the brake carrier 4 is a brake housing 11 having an essentially U-shaped cross-section and straddling a (non-illustrated) brake disc. Brake pads 12, 13 are arranged on either side of the brake disc and are straddled by the brake housing 11. In one limb of the brake housing 11 an actuating device is arranged which includes a piston 49 and a cylinder. The actuating device acts directly on one of the pads and acts indirectly on the other pad by way of the brake housing so as to press them against the brake disc. Axial displacement of the brake housing 11 is acheived by the guide arrangement. Accordingly, the brake housing 11 has two lateral projections 14, 15 provided with axial bores 16, 17. The dimensioning of the axial bores 16, 17 is such as to ensure that there remains an annular space between them and the axial guide bolts 5, 6. A rubber sleeve 19 is arranged in the annular space formed by the axial bore 16. At its ends, the rubber sleeve 19 has flanges by means of which it is held axially non-displaceably in the axial bore 16. Due to the elastic yield of the rubber sleeve 19 in the radial direction the guidance forms a movable bearing. Two metal guide bushing 20, 21 are arranged in the annular space formed by the axial bore 17. The axial guide bolt 5 is surrounded by the metal guide bushings 20, 21 in a manner essentially free from play thus forming on this side of the brake a fixed bearing.

In the projections 14, 15 cylindrical recesses 22, 23 are formed which are open towards the brake carrier 4. Arranged in the recesses 22, 23 are protecting caps 24, 25 each fastened with one of the end portions 26, 27 of their folded collars. The end portions 26, 27 have reinforcing rings 28, 29 completely enclosed by the elastic material of the protecting cap. The end portions 26, 27 sit with a bias close in the recesses so as to abut them. Folded portions 30, 31 are provided adjacent the end portions 26, 27. The folded portions 30, 31 are, followed by end portions 32, 33. The end portions 32, 33 are received in metal rings 34, 35 seated with press fit on the guide sleeves 7, 8.

In the following description only ring 34 is described because both rings 34, 35 are of the same design. The rings 34, 35 are essentially U-shaped as seen in longitudinal section. One of the side walls 36 of the rings is elongated radially outwards and forms an end portion 38 at least partially bent over the U-shaped area confined by the side walls. The bent-off end portions 38 extend at an angle relative to the longitudinal axis of the rings. The angle may have various inclinations. The elongated side walls 36 of the metal rings 34, 35 rest at the holding arms 2, 3 of the brake carrier 4. Due to the good contact of the metal ring at the brake carrier, the area of contact will be kept free from dirt. The end portions 32, 33 are seated in the metal rings 34, 35 so as to be able to be turned relatively easily within the rings.

If in the illustrated disc brake the brake housing 11 is to be opened, such as for exchanging pads, the screw 10 of the movable bearing is screwed out of the holding arm and removed from the guide sleeve 7. As the metal ring is firmly seated on the guide sleeve 7 the guide sleeve is axially displacable within the rubber sleeve 19 only a limited amount and thus is kept within the same so as to not get lost. During the subsequent opening of the brake housing 11 the end portion 33 of the protecting cap 25 can turn within the metal ring 35. As the end portion is protected within the metal ring damage will thus be avoided. This arrangement also prevents corrosion. An axially extending pin 48 is provided at the holding arm 3 of the brake carrier 4 so as to limit the swivelling motion of the brake housing 11. When the brake housing 11 is opened, an associated component of the brake housing 11 will come to rest at the pin 48.

A metal ring 50 is arranged between a folded collar 51, which collar is located between the piston 49 and the housing 11 so as to protect the folded collar 51 from thermal action and to prevent the rubber material from deterioration. The thermal action primarily emanates from the brake pad 13 heating during brake application. The elastic ring elements 52 are bent out of the radial plane and are provided with semi-spherical or generally cylindrical knobs 54 and guide surfaces 53, likewise bent out of said plane, and effect a safe and tight fit at the piston 49. The knobs 54 catch a corresponding indentation or groove provided at the piston 49.

The folded collar is fitted in annular grooves in the piston 49 and in the cylinder and protects the piston and cylinder sliding surfaces from dirt and water. A recess is provided at the housing 11 so as to receive the bellow-type portion of the folded collar 51 with its enlarged outside diameter. The curved outside radius of the metal ring 50 penetrates into this recess, at least when the piston 49 is completely moved back. The outside area of the metal ring 50, which is bent to the rear, protects the elastic folded collar 51 from being damaged in particular upon closing of brake calipers if the piston 49 does not move back sufficiently.

So as to maintain stiffness of the metal ring 50, the ring is an essentially U-shaped form. Bending the guide surfaces 53 and the ring elements 52 provided with knob-like projections 54 out of the radial plane so as to ensure that these surfaces and elements essentially extend in a parallaxial manner also serves to receive any occurring forces and torques. The design of the ring elements 52 essentially is square and, for the purpose of receiving elastic deformations for catching the provided recesses at the piston 49, they have smaller cross sectional surfaces in the the radial section plane than the guide surfaces 53, which, due to their higher flexural strength, are suited for the transmission of any occurring torques.

In the preferred embodiment of this invention, the guide surfaces 53, as well as the ring elements 52, are provided in quadruplicate and are arranged at the circumference in a regularly alternating symmetrical manner.

What is claimed is:

1. A hydraulically actuated braking apparatus for spot-type disc brakes, comprising a housing having a cylinder, a piston in said cylinder adapted to act on a brake pad, a metal ring mounted in a first groove on an outside surface of the piston and an elastic folded collar fastened in a second groove on said outside surface of said piston behind the metal ring, one end portion of said folded collar being mounted at the circumference of the piston and a second end of the collar being mounted at the circumference of the cylinder and a plurality of inwardly directed knobs radially distributed at an inside circumference of the metal ring on elastic ring elements, said ring elements being axially bent out of a radial plane, said knobs extending into said first groove of said piston thereby providing a connection with said groove of said piston to position said ring element in a defined axial position, and said metal ring partially embracing the folded collar.

2. A braking apparatus as claimed in claim 1, wherein guide surfaces are distributed at the inside circumference of the ring.

3. A braking apparatus as claimed in claim 1, wherein the metal ring is essentially U-shaped in an axial cross section.

4. A braking apparatus as claimed claim 1, wherein the outside circumference of the metal ring is axially bent so as to provide the metal ring with an elongated outside wall.

5. A braking apparatus as claimed claim 1 wherein the metal ring is fixed at a position defining a predetermined axial distance with respect to an end of the piston and to the brake pad.

* * * * *